US008645342B2

(12) United States Patent
Novak et al.

(10) Patent No.: US 8,645,342 B2
(45) Date of Patent: *Feb. 4, 2014

(54) SCOPE BASED INDEXING PRIORITIZATION

(75) Inventors: Michael J. Novak, Redmond, WA (US); Christopher C. McConnell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/586,708

(22) Filed: Aug. 15, 2012

(65) Prior Publication Data

US 2012/0310907 A1    Dec. 6, 2012

Related U.S. Application Data

(63) Continuation of application No. 12/341,762, filed on Dec. 22, 2008, now Pat. No. 8,296,276.

(51) Int. Cl.
*G06F 17/30*    (2006.01)

(52) U.S. Cl.
CPC ............... *G06F 17/30017* (2013.01)
USPC .......................................................... 707/696

(58) Field of Classification Search
USPC .......... 707/696, 706, 707, 711, 715, 723, 770
See application file for complete search history.

(56) References Cited

U.S. PATENT DOCUMENTS

| 6,775,666 B1* | 8/2004 | Stumpf et al. ................. 1/1 |
| 7,725,508 B2* | 5/2010 | Lawarence et al. ........... 707/830 |
| 7,783,689 B2 | 8/2010 | Richardson et al. |
| 7,827,184 B2* | 11/2010 | Zhang et al. ................... 707/748 |
| 8,296,276 B2 | 10/2012 | Novak |
| 2005/0050028 A1 | 3/2005 | Rose et al. |
| 2008/0178079 A1* | 7/2008 | Chen et al. ..................... 715/700 |
| 2010/0161570 A1 | 6/2010 | Novak |

OTHER PUBLICATIONS

David W. Coit et al., Prioritizing System-Reliability Prediction Improvements, 2001, IEEE, 17-25.*
"Advisory Action", U.S. Appl. No. 12/341,762, (Dec. 1, 2011), 3 pages.
"Final Office Action", U.S. Appl. No. 12/341,762, (Oct. 18, 2011), 8 pages.
"Non-Final Office Action", U.S. Appl. No. 12/341,762, (Feb. 2, 2012), 5 pages.
"Non-Final Office Action", U.S. Appl. No. 12/341,762, (Mar. 21, 2011), 7 pages.
"Notice of Allowance", U.S. Appl. No. 12/341,762, (Jun. 20, 2012), 8 pages.
Pingali, Gopal S., et al., "Instantly Indexed Multimedia Databases of Real World Events", *IEEE Transactions on Multimedia*, vol. 4., No. 2, (Jun. 2002), 14 pages.

* cited by examiner

*Primary Examiner* — Jean B Fleurantin
(74) *Attorney, Agent, or Firm* — Wolfe-SBMC

(57) ABSTRACT

Methods and systems provide a tool for prioritizing the ordering of outstanding indexing work in order to bring a particular portion of an indexing source up to date quickly and to reduce the likelihood of inconsistencies between an index-backed view and a direct view of a source. In accordance with the described embodiments, indexing of items can be prioritized based upon a user's view or metadata contained within a query. Further, in at least some embodiments, the tool can decide the order to index items based upon multiple prioritization requests.

20 Claims, 5 Drawing Sheets

| | URL to index | Priority Stack Index | Default Prioritization |
|---|---|---|---|
| 402 | C:\foo\a.txt | 0 – top element | HIGH – txt is a known type |
| 404 | C:\foo\a.tin | 0 – top element | LOW – tin is not known |
| 406 | C:\bar\a.txt | 1 – second element | HIGH – txt is a known type |
| 408 | C:\new\a.txt | Not found | HIGH – txt is a known type |
| 410 | C:\abc\a.txt | Not found | HIGH – txt is a known type |

Fig. 4

| Locations to prioritize: | Priority |
|---|---|
| C:\foo | Foreground |
| C:\bar | High |

Fig. 5

SCOPE BASED INDEXING PRIORITIZATION

RELATED APPLICATION

This application is a continuation of and claims priority under 35 U.S.C. §120 to U.S. patent application Ser. No. 12/341,762, filed on Dec. 22, 2008, the disclosure of which is incorporated by reference herein in its entirety.

BACKGROUND

Searching and browsing over the information stored in a computing device is an important task. In order to speed up these operations an indexer goes through the information and builds indices by interrogating a source and capturing descriptive properties and token occurrence information for each item in the source. Doing so allows for fast searching and metadata-based queries over the source. Performing this interrogation can, however, be a resource intensive process that can interfere with the normal utilization of the computing device. Accordingly, most indexing solutions employ some form of "back-off" to slow the rate of indexing and prevent indexing from consuming an undue amount of resources.

Thus, whether or not some form of back-off is employed, this slowed indexing rate can lead to a potential inconsistency between the items represented by the actual source being interrogated and those stored in a database of an indexing solution. As such, the indexing solution can lag behind the actual source being interrogated resulting in a failure to be in full synchronization with the source. This inconsistency or lack of synchronization can lead to inaccurate results and can frustrate the user.

SUMMARY

Methods and systems provide a tool for prioritizing the ordering of outstanding indexing work in order to bring a particular portion of an indexing source up to date quickly and to reduce the likelihood of inconsistencies between an index-backed view and a direct view of a source. In accordance with the described embodiments, indexing of items can be prioritized based upon a user's view or metadata contained within a query. Further, in at least some embodiments, the tool can decide the order to index items based upon multiple prioritization requests.

BRIEF DESCRIPTION OF THE DRAWINGS

FIG. 4 illustrates an example priority queue in accordance with one or more embodiments.

FIG. 5 illustrates an example prioritization stack in accordance with one or more embodiments.

DETAILED DESCRIPTION

Overview

Methods and systems provide a tool for prioritizing the ordering of outstanding indexing work in order to bring a particular portion of an indexing source up to date quickly and to reduce the likelihood of inconsistencies between an index-backed view and a direct view of a source. In accordance with the described embodiments, indexing of items can be prioritized based upon a user's view or metadata contained within a query. Further, in at least some embodiments, the tool can decide the order to index items based upon multiple prioritization requests.

In one described embodiment a software component, referred to as an indexer, prioritizes items to be indexed based on a query that is associated with those items. Based on this prioritization, the indexer can utilize sufficient resources to perform the indexing while maintaining synchronization with the source being indexed. In the discussion that follows, a first section entitled "Operating Environment" is provided that describes an environment in which the various embodiments may operate. Following this, a section entitled "Example Methods" describes example methods in accordance with one or more embodiments. After that, a section entitled "Implementation Example" provides and describes some example implementations of an indexing solution. Finally, a section entitled "Example System" is provided and describes an example system in which the indexing solution can be utilized.

Operating Environment

Figure 1:
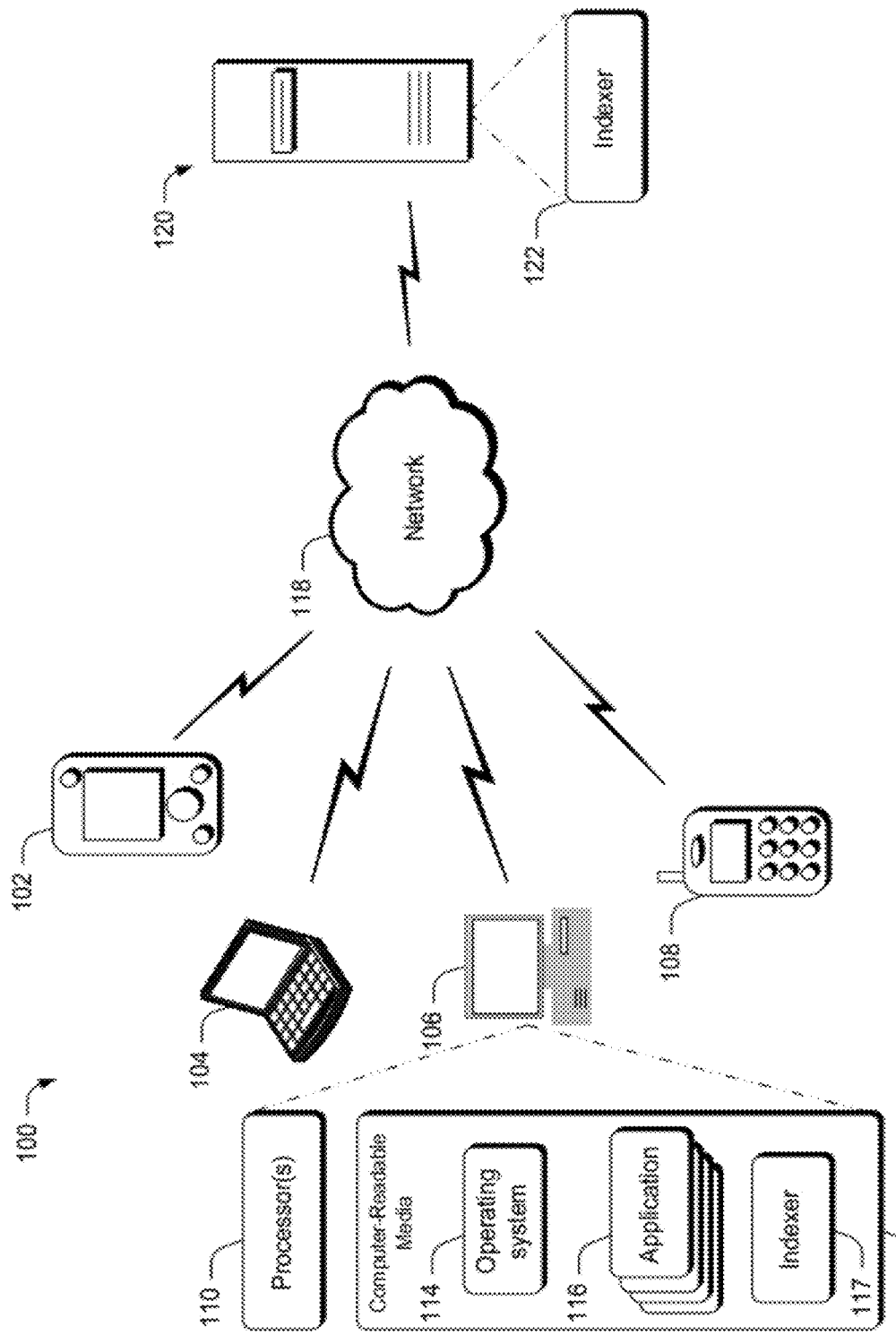
FIG. 1 illustrates an operating environment in accordance with one or more embodiments.

FIG. 1 illustrates an operating environment in accordance with one or more embodiments, generally at 100. Operating environment 100 includes multiple different computing devices, examples of which are shown at 102, 104, 106, and 108. The computing devices can be used by a user to consume or otherwise interact with content, examples of which can include content utilized by the indexer described below. Individual computing devices can typically include one or more processors 110, one or more computer-readable media 112, an operating system 114 and one or more applications 116 that reside on the computer-readable media and which are executable by the processor(s).

In addition, in one or more embodiments, computer readable media 112 can include software in the form of an indexer 117 that performs indexing on files, databases or other information, such as that described herein. For example, the indexer can index a portion of a database based on a query, as well as prioritize multiple different queries as described below. Typically, an indexer makes searching and browsing more efficient by building a database to summarize and centralize information found in each indexed item. The database also contains a number of different kinds of indices that organize the summarized information to allow efficient searching and browsing. The process of populating the database is organized by having a list of all the items that need to be processed because they are new or have changed since last processed.

The computer-readable media can include, by way of example and not limitation, all forms of volatile and non-volatile memory and/or storage media that are typically associated with a computing device. Such media can include ROM, RAM, flash memory, hard disk, removable media and the like.

In addition, in at least some embodiments, environment 100 includes a network 118, such as a local network or the Internet, via which content can be received and sent. Content and other data or information can be received over network 118 by way of a server 120 that has access to the content and/or information associated with the content. In at least some embodiments, server 120 can include an indexer 122 as well.

The computing devices can be embodied as any suitable computing device such as, by way of example and not limitation, a desktop computer (such as computing device 106), a portable computer (such as computing device 104), a handheld computer such as a personal digital assistant (e.g., computing device 102), a cell phone (such as computing device 108), and the like. One example of a computing device is shown and described below in relation to FIG. 6.

Having discussed the general notion of an example operating environment in which various embodiments can operate, consider now a discussion of example methods of operation in accordance with the described embodiments.

Example Methods

Figure 2:
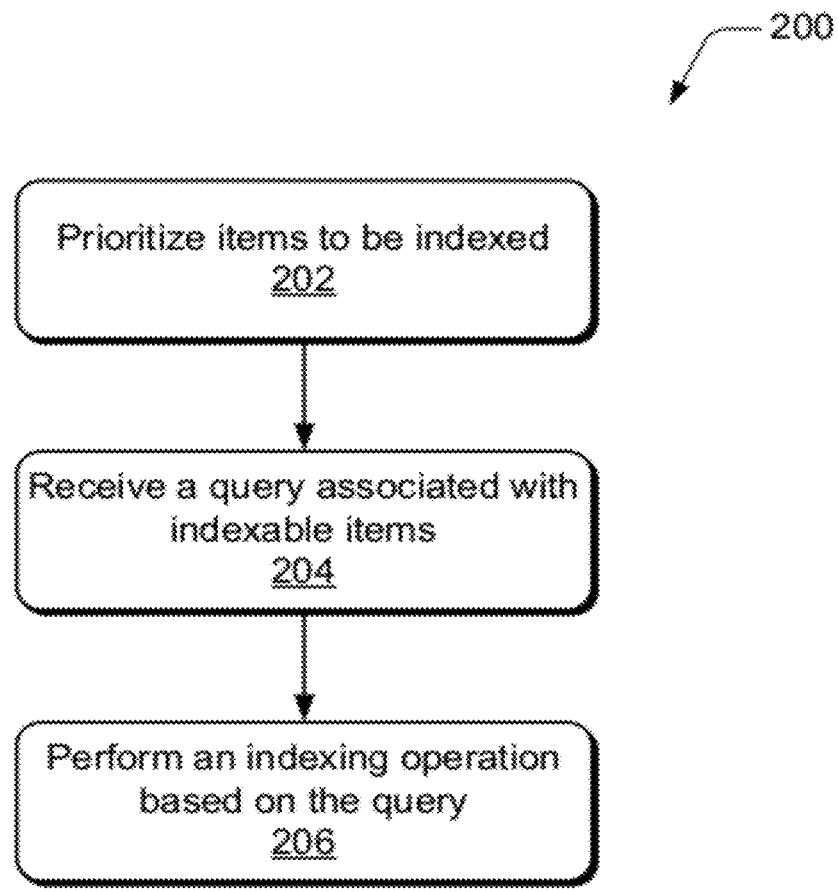
FIG. 2 is a flow diagram that describes steps in a method in accordance with one or more embodiments.

FIG. 2 is a flow diagram that describes steps in a method in accordance with one embodiment generally at 200. The method can be implemented in connection with any suitable hardware, software, firmware or combination thereof In at least some embodiments, the method can be implemented using a system such as the one described above. The order in which the method is described is not intended to be construed as a limitation, and any number of the described steps can be combined in any order to implement the method as appropriate.

Step 202 prioritizes items to be indexed. This step can be performed in any suitable way. For example, in one or more embodiments, indexable items may be assigned a higher or lower prioritization in response to a user action such as a pivoted view action or an explicit search. In addition, the indexer can prioritize items that are tagged as directories, such as items that generate other items, ahead of non-directory items. This allows the indexer to have more knowledge about what items are to be indexed to provide a way to quickly honor requests to prioritize certain locations or to get statistics regarding the status of a particular location. This also provides a way for the items that a user would most likely be searching to be prioritized before other items.

Beyond the basic prioritization of directories, items in general can further, in at least some embodiments, be prioritized according to a basic set of rules that can be inferred from knowing an item's URL. The priority of items, in this regard, can be influenced by properties such as, by way of example and not limitation, whether a particular item has been indexed before, whether the file type of the item has a registered property handler, whether the file type of the item has a registered IFilter handler, whether the file is located in a common location that users store data such as profile or library locations, and/or whether the file is located in a location not commonly used to store user data such as an operating system directory. This list of properties is intended to be illustrative and not exclusive. Other properties not listed may also influence the priority of items. By way of example and not limitation, items with property handlers such as a picture or JPEG can be prioritized over an extension that is not understood. Additionally, common places that a user has personal files can be prioritized over other locations. This basic level of prioritization allows the indexer to quickly identify which items should be indexed first and also to order indexing of items in a basic manner consistent with processing file types and locations that the user is more likely to interact with first.

Step 204 receives a query associated with indexable items. The query can be any suitable query such as, for example, an explicit search where a user has typed a term expecting results, or a query generated by an application. For example, a user may interact with an application's user interface that provides a pivotable view of items presented in the user interface. Responsive to pivoting the view, the application may spawn a query. Alternately or additionally, a user might also stack or group items to form a query. Step 206 performs an indexing operation based on the query. This can be performed in any suitable way. For example, this step can be performed using, at least in part, an indexer such as that described above and below.

Figure 3:
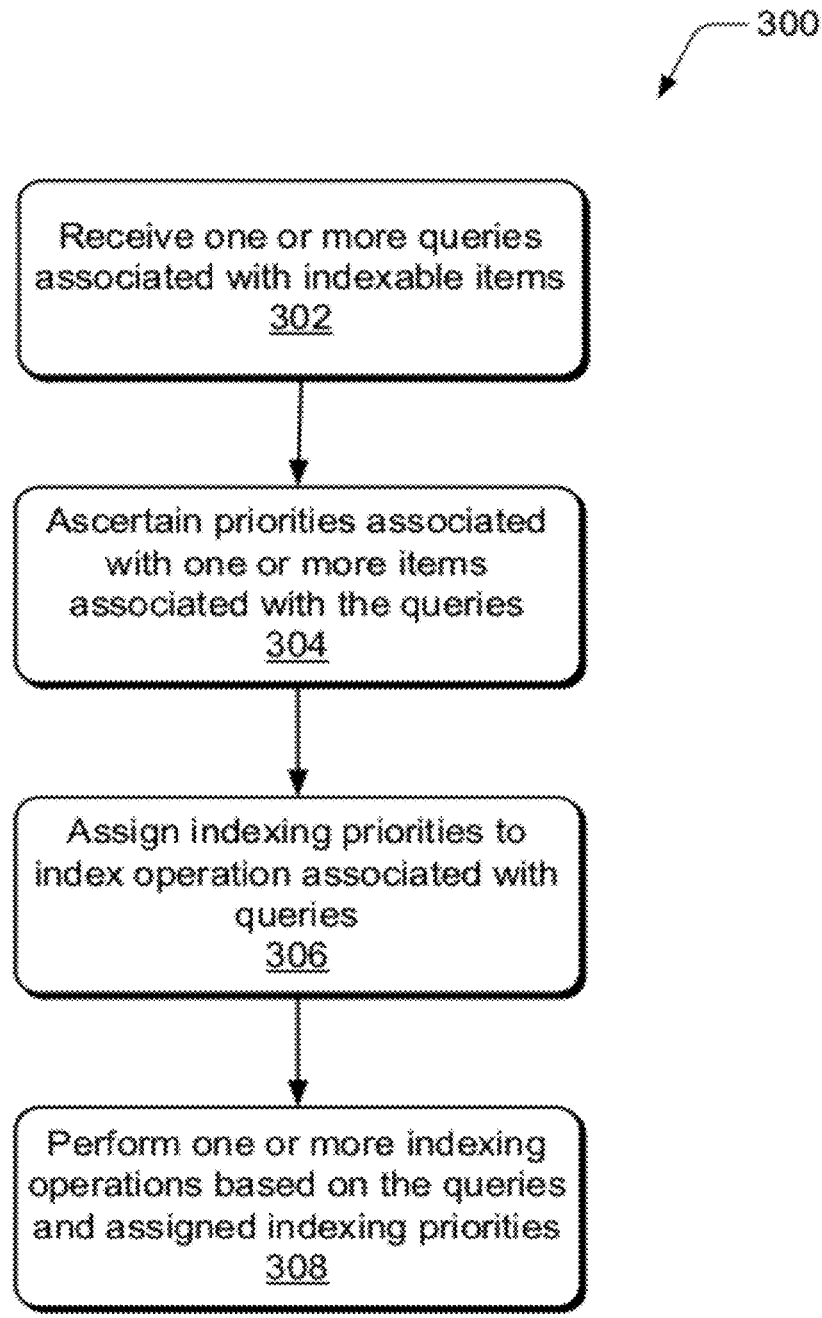
FIG. 3 is a flow diagram that describes steps in a method in accordance with one or more embodiments.

FIG. 3 is another flow diagram that describes steps in a method in accordance with one embodiment generally at 300. The method can be implemented in connection with any suitable hardware, software, firmware or combination thereof. In at least some embodiments, the method can be implemented using a system such as the one described above. The order in which the method is described is not intended to be construed as a limitation, and any number of the described steps can be combined in any order to implement the method as appropriate.

Step 302 receives one or more queries associated with indexable items. This step can be performed in any suitable way. For example, queries can be generated based upon an explicit user-generated query and/or an application-initiated query. Indexable items can include, by way of example and not limitation, files or folders in a database. In one or more embodiments, queries are received and placed into a stack that is to be used by the indexer. The stack determines the order in which the indices associated with each query are updated. The process of updating the indices sends notifications to the source of the query so that the source knows new items are potentially available if the query were re-executed.

Step 304 ascertains priorities associated with items associated with the queries. This step can be performed in any suitable way. In one or more embodiments, priorities can be designated specifically by a user, directly or indirectly, or by an application. For example, a user may directly designate a priority, such as, for example, responding to a prompt for such a designation. Alternately or additionally, a user may indirectly assign a priority for a query by opening a Web browser to search within a directory of files. In addition, an application may designate a priority based on its default programming or settings, or in response to user interaction.

Step 306 assigns indexing priorities to index operations associated with the queries. This step can be performed in any suitable way. For example, in one or more embodiments, different prioritization levels can be employed. As but one example, different prioritization levels can include, in descending order of priority, Foreground, High, Low, and Default. These prioritization levels are described in more detail below.

Step 308 performs one or more indexing operations based on the queries and assigned indexing priorities. This step can be performed in any suitable way. From these queries, the indexer can distill relevant information which then allows the indexer to focus on the specific subject of the query in order to perform its indexing operations. For example, in one or more embodiments, the indexer can selectively index items that may satisfy the query while not prioritizing items which are known to fall outside of a range of the query. Therefore, new or out of date items that are more likely to match the query can be indexed before other items. Accordingly, this allows the indexer to service the query in a more accurate manner. For instance, even though there are items that need to be indexed across the whole system, the indexer may know of files that belong to a specific directory, such as a music directory. In such an example, when a query is generated specific to music files, the indexer is enabled to index the music directory before indexing the other items that need to be processed. This functionality is due to the prioritization of directories that match the query. In this example, the music directory matches a query for music but does not match a query for a directory that contains text files. Hence, by bypassing unlikely directories the indexer can quickly ensure that the results for a specific query are accurate even though there are still items to be indexed in other directories. Alternatively, in the example above involving the prioritization of common places that the user has personal files, such as a user's directory, the user's directory may be indexed before a general operating system directory. Thus, without bringing the entirety of a system up to date, the indexer can specifically focus its work to bring the specific user's directory up to date.

The assigned priorities, as described above, can have several different levels. In the specific example given above, the highest level of priority is Foreground. Foreground essentially indicates that a particular query will cause the indexer to use all or as many system resources as desirable to bring the indices used by the query up to date as quickly as possible. Further, indexing work that is to be performed responsive to this assigned priority will be performed without attempting to "back-off". Back-off behavior generally means that the rate of indexing has been slowed in order to prevent the indexing from using an undue amount of resources. Using back-off behavior can allow other applications or operations to utilize system resources sufficient to function properly without the indexing adversely impacting system resources.

A second level of priority is High. A High priority is similar to Foreground. Specifically, this priority level causes the indexer to use as many resources as possible to update the indices used by a particular query except that the indexer will also respect back-off behavior. An operation with a High priority will attempt to not adversely impact system resources by utilizing back-off behavior. Therefore, this level of prioritization will accommodate for other operations with a higher prioritization by using less system resources until those higher prioritized operations are completed.

A third level of priority is Low. A Low priority is similar to a High priority except for one distinction. Specifically, with a Low priority, a queries indices will be updated only after the indices of any High or Foreground query are updated. But, a query with a Low priority will be prioritized ahead of typical background processing. If, for example, another query comes into the stack with a priority of High or Foreground, then the indices for the other query will be updated before the indicies of the Low priority query. A Low priority query will become first priority if all other queries above it have completed updating their indices or have nothing more to index.

The lowest level of priority is Default. This signifies that there is no prioritization specific to a query. Consequently, the default prioritization will be performed along with background processing and will be prioritized below anything else.

Having described various embodiments as well as methods of operation in general, consider now a description of an implementation example in which the described embodiments can be employed.

Implementation Example

In accordance with one or more embodiments, a user can effectively perform some sort of action on a user interface, such as pivoting a view that in turn causes a query on the indexer. Alternately or additionally, a user may cause a query on the indexer by specifically executing a search. In one or more embodiments, queries can be based on location as well as types. For example, a query might be associated with a particular location in which files are known to be stored. Alternately or additionally, queries can be based on file or content types. For example, a query might be issued for files that reside in one or more music folders. Alternately or additionally, the query might be issued for JPEG file types.

As another example, when a user employs an application to browse content in a database, the user may wish to sort the content in a certain way. For example, the user may wish to group content items according to a content item's author. For example, a user may wish to select all content items that have an author "Chris" or every song by "Coldplay". When the user takes an action to effect such a filter, a query can be spawned that indicates that indexing is to be performed on items having the indicated author. Indexing operations can now be performed on those items that satisfy the query. Other criteria may also be employed to define a query. Such criteria can include but are not limited to a URL, the last modified time, and/or any other property or parameter provided by or to the system.

In accordance with one or more embodiments, the indexer can utilize at least two arrays of information. One array of information is shown generally at 400 in FIG. 4 and comprises an example priority queue. The priority queue is a mechanism that is used for organizing within each element of a stack. In this example, the priority queue includes three columns a first of which entitled "URL to index", a second of which entitled "Priority Stack Index", and a third of which entitled "Default Prioritization". The "URL to index" column contains a list of items to index. In this example, the items to be indexed are locations based on URLs. The column entitled "Priority Stack Index" indicates a designated priority corresponding to each item in the first column. For example, the top two items in the first column have the same designated priority in the second column and therefore, will be indexed accordingly. The third item has a different designated priority in the Priority Stack Index and will be indexed accordingly. The last two items do not have designated priorities; therefore, these items will be indexed according to Default Prioritization designated in the third column.

A second array of information can be, for example, a stack of prioritization requests as shown generally at 500 in FIG. 5. In this example, the prioritization stack includes two columns a first of which entitled "Locations to prioritize", and a second of which entitled "Priority". The first column includes a list of locations. The second column includes priority levels assigned to each location in the first column. In this example, the top element, "C:\foo", is assigned a Foreground priority and the second element, "C:\bar", is assigned a High priority.

The priorities in the prioritization stack interrelate with the priority queue in FIG. 4. The interrelation between these two arrays can be shown with the following example. Assume an indexer has five outstanding items to index shown in the first column of the priority queue in FIG. 4. These items will be indexed in top-down sorted order with the items at the top of the list being indexed first. In this example, items 402 and 404 both indicate a priority stack index of "0—top element". This indicates a connection with the top element in the prioritization stack in FIG. 5. There, the top element, "C:\foo", is assigned a Foreground priority. Therefore, the corresponding items to be indexed in FIG. 4 will be indexed without any restriction on indexing speed. Item 406 in FIG. 4 shows in the Priority Stack Index a "1—second element", which indicates a connection to the second element in the prioritization stack in FIG. 5. There, the second element, "C:\bar", is assigned a High priority. Therefore, item 406 in FIG. 4, "C:\bar\a.txt", will be indexed accordingly. The last two items in FIG. 4, items 408 and 410, show that a priority stack index is not found. When the priority stack index is not found, the corresponding items to be indexed will be prioritized according to default prioritization levels in the third column. Additionally, items having the same assigned priority in the Priority Stack Index column will be indexed according to default priorities designated in the third column. For example, items 402 and 404 both have a Foreground priority, but their default priorities are High and Low, respectively. This indicates that both items 402 and 404 will be indexed ahead of other items with lower priority levels such as item 406, which has a High priority as described above. However, within that Foreground priority, further prioritization takes place. Item 402 will be indexed before item 404 because the priority level for item 402 is higher than that of item 404. Once the indexing of items 402 and 404 is completed, the indexer will then service item 406, which is the next item down in the array. Once item 406 has been indexed, the next item will be indexed. In this example, both of the next two items, items 408 and 410, have the same default High priority shown in the third column. Item 408 will be indexed first because it is higher up in the stack.

Once indexing on those items has completed, the indexer will move on to any entry matching the second query in the prioritization stack 500, for example "C:\bar". If a new item were to come in for "C:\foo", that item would automatically be inserted into the priority queue 400 at its proper sorted position. The proper sorted position for such an item would be on the top of the stack and would then be processed next. If, for example, a new item prioritized as Low were to come in to the stack, that item would automatically be inserted at the bottom of the priority queue 400 and would be prioritized above only those items with default prioritization.

In one embodiment, applications can designate a priority level. For example, a user may open a music file using their Web browser. Assume that the Web browser is programmed to assign Foreground priorities to music files. The music files will thus be indexed accordingly. However, consider now that the user opens a different application which prioritizes pictures or images with a High prioritization level. Opening this application effectively places the Web browser in the background. The Web browser is programmed to understand that it is has not been closed, but that the user is no longer interacting with it. Further, the user, through his or her actions, has essentially indicated that the indexing operations associated with the Web browser are not as important as indexing operations associated with the newly-opened application. Therefore, in this example, Foreground music file prioritization will drop down below the new High prioritization for the pictures or images. Accordingly, the indexer would then prioritize music files as High until the user takes some other action to re-establish the priorities.

In the example above, the indexing solution may not rely solely on the Web browser to assign proper priority levels for indexing. Rather, the indexing solution can instead cause priorities to be applied in response to a user's interaction. Specifically, the Web browser that opened the music file can still consider its operation to be highly important, but the indexer will not allow the indexing caused by the Web browser to continue with a Foreground priority when the newly-opened application is deemed to be more important. The indexing solution can enforce a prioritization by overriding the priority level set by the Web browser sufficient to cause the indexing associated with the Web browser to be lowered to a High priority in order to accommodate system resources for the newly-opened application. Accordingly, the solution can keep an operation or application that is not at the top of the stack from using an undue amount of system resources. This provides a way for the system to service the query faster since indexing resources are being limited and update the indexes more accurately.

In an alternative embodiment, the prioritization can be user specific. For example, when a user opens a window to view their music files, the indexer can identify how out of date an index from a previously-performed indexing operation is. If the index is out of date by some definable metric, the indexer may prompt the user by asking if the user wants to run indexing in the Foreground. Further, the system can keep track of the indexing and notify the user when the indexing is completed.

In one embodiment, information that comes from a generated query is adaptable for individual users that may not have actually issued a query. This approach is dynamic in the sense that it can adapt to user specific parameters. For example, a user's history information may describe what the particular user seems to consume or use more often. This information can be used to modify the indexing priorities. For example, if a particular user frequently browses their photos and infrequently browses their music collection, then the priorities can be modified to reflect that history.

In one embodiment, applications can determine which item is at the top of a stack of items to be indexed. Such a determination can be in response to a user action on a user interface. For example, the item on top of the stack may be the last request for prioritization on the Foreground or High prioritization levels. In addition, an application or user window or user invocation of an application that designates a query as Foreground or High can cause a query or item to be positioned at the top of the stack. If the higher prioritized items in the stack have nothing more to index, an associated entry on the stack will remain on the stack and the next element of the stack will be indexed. When indexing on the next element is complete, indexing will continue with each subsequent element in the stack until the items remaining are items with default priority. For example, consider one Foreground item at the top of a stack, one High item just underneath, and one Low item underneath that. If no indexing is to be done or indexing is complete in the Foreground or the High items, then the Low item will be indexed. If indexing is complete or is not to be done for all items with Foreground, High, and Low priorities, then the Default level prioritization will be indexed.

In one embodiment, the system can operate in a dynamic mode, meaning if an item further up the stack is changed, then that item will get prioritized and get indexed immediately. For example, assume a user has a Foreground item and a second item as High. If the user brings into focus a window associated with the content that is the subject of the High prioritization, then indexing associated with the High prioritization would move ahead of the Foreground prioritization and the Foreground prioritization would drop down to High prioritization.

Alternately or additionally, in at least some embodiments, eventing can be used to affect how indexing is applied. For example, if at a given point in time a new item or a new operation comes into the stack that would belong to the top level of the stack, that new item or operation can occur next. In other words, a new item or operation that enters the stack can be prioritized according to an association with another item already located in the stack. Further, in at least some embodiments, the system can notify the user that a new item has been added to the user's query. This notification can allow the user to update any results based on new items that come into the stack.

In one or more embodiments, the indexer can be configured to report statistics based upon query criteria. For example, the indexer can report how many items are indexed that pertain to a particular query, how many items have yet to be indexed, and how many items have been indexed before but need re-indexing. Such statistics can be very helpful in making dynamic decisions. For example, if there are only a few items out of date, then Foreground prioritization can be recommended and utilized. However, if there are a substantial number of items out of date, then High prioritization can be recommended and utilized. An application can use such statistics to decide what kind of prioritization it desires. Further, dynamic statistics can be provided during indexing, which can display the number of items indexed as well as the number of remaining items to be indexed. As indexing proceeds, an accurate number of remaining items can be provided to a user or application, which can assist the user or application in changing a priority level, if so desired.

Example System

Figure 6:
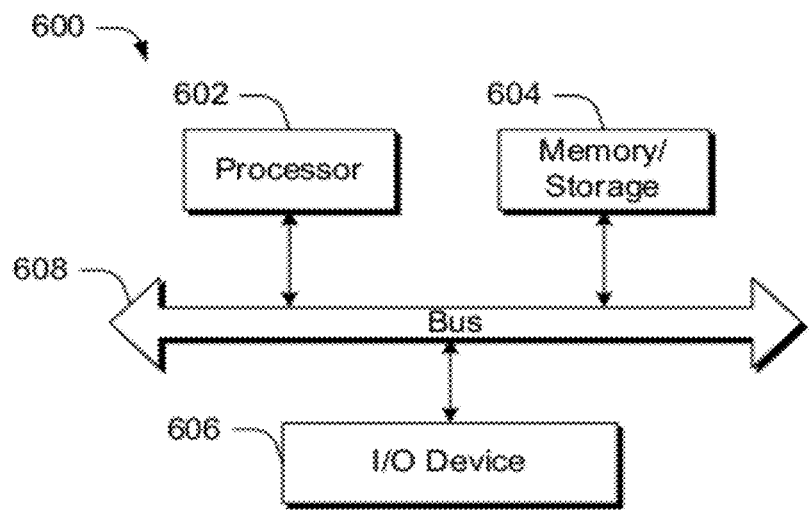
FIG. 6 is a block diagram of an example system that can be utilized to implement one or more embodiments.

FIG. 6 illustrates an example computing device 600 that can implement the various embodiments described above. Computing device 600 can be, for example, various computing devices or servers, such as those illustrated in FIG. 1 or any other suitable computing device.

Computing device 600 includes one or more processors or processing units 602, one or more memory and/or storage components 604, one or more input/output (1/0) devices 606, and a bus 608 that allows the various components and devices to communicate with one another. Bus 608 represents one or more of any of several types of bus structures, including a memory bus or memory controller, a peripheral bus, an accelerated graphics port, and a processor or local bus using any of a variety of bus architectures. Bus 608 can include wired and/or wireless buses.

Memory/storage component 604 represents one or more computer storage media. Component 604 can include volatile media (such as random access memory (RAM)) and/or nonvolatile media (such as read only memory (ROM), Flash memory, optical disks, magnetic disks, and so forth). Component 604 can include fixed media (e.g., RAM, ROM, a fixed hard drive, etc.) as well as removable media (e.g., a Flash memory drive, a removable hard drive, an optical disk, and so forth).

One or more input/output devices 606 allow a user to enter commands and information to computing device 600, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Methods and systems provide a tool for prioritizing the ordering of outstanding indexing work in order to bring a particular portion of an indexing source up to date quickly and to reduce the likelihood of inconsistencies between an index-backed view and a direct view of a source. In accordance with the described embodiments, indexing of items can be prioritized based upon a user's view or metadata contained within a query. Further, in at least some embodiments, the tool can decide the order to index items based upon multiple prioritization requests.

Although embodiments have been described in language specific to structural features and/or methodological steps, it is to be understood that the embodiments defined in the appended claims are not necessarily limited to the specific features or steps described. Rather, the specific features and steps are disclosed as example forms of implementing the claimed embodiments.

What is claimed is:

1. One or more computer readable storage memory comprising computer readable instructions which, when executed, implement a system comprising:
    an indexer configured to perform indexing on indexable items stored at a source;
    a first array of information comprising a priority queue that is configured to be used for organizing within each element of a stack, the priority queue including entries associated with: a list of items to index, a priority stack index that includes a designated priority for individual items in the list of items, and a default prioritization that includes designations for individual items in the list of items to be used for indexing in an event that individual items do not have a designated priority in the priority stack index; and
    a second array of information comprising a stack of prioritization requests, the stack of prioritization requests including entries associated with locations to prioritize and a priority associated with individual entries in the stack of prioritization requests;
    wherein priorities in the prioritization stack interrelate with the priority queue through associations between the locations to prioritize and the items in the list of items; and
    the indexer being configured to use the priority queue and stack of prioritization requests to prioritize indexing operations.

2. The one or more computer readable storage memory of claim 1, wherein the list of items comprises locations based on URLs.

3. The one or more computer readable storage memory of claim 1, wherein the indexer is configured to allow one or more applications to designate a priority level at which indexing operations are to take place.

4. The one or more computer readable storage memory of claim 1, wherein the indexer is configured to allow user actions to designate a priority level at which indexing operations are to take place.

5. The one or more computer readable storage memory of claim 1, wherein the indexer is configured to utilize priority levels comprising at least Foreground, High, Low, and Default priority levels.

6. The one or more computer readable storage memory of claim 1, wherein the indexer is configured to enforce a prioritization by overriding priority levels set by one or more applications.

7. The one or more computer readable storage memory of claim 1, wherein the indexer is configured to enable prioritization of indexing operations to be user specific by prompting the user to run indexing.

8. The one or more computer readable storage memory of claim 1, wherein the indexer is configured to operate in a dynamic mode in which if an item in the stack is changed, the item's corresponding priority is changed for purposes of performing indexing operations.

9. The one or more computer readable storage memory of claim 1, wherein the indexer is configured to report statistics based upon query criteria associated with a query configured to cause an indexing operation.

10. A computing device comprising:
one or more processors; and
one or more computer readable storage media which, when executed by the one or more processors, perform operations comprising:
prioritizing items to be indexed, the priority of the items determining an indexing order in which the items are to be indexed, wherein assigned priorities are based, at least in part, on a type of query, and wherein one type of query comprises a query associated with user history information;
receiving a query associated with indexable items; and
performing an indexing operation on the items based on the query, the query being configured to enable the indexing order to be changed to be a different indexing order.

11. The computing device of claim 10, wherein assigned priorities are based, at least in part, on a location.

12. The computing device of claim 10, wherein the query comprises an application-initiated query.

13. The computing device of claim 10, wherein the query comprises a user-generated query.

14. The computing device of claim 10, wherein an order of one or more indexing operations is based, at least in part, on a location in a stack of priorities.

15. A computing device comprising:
one or more processors; and
one or more computer readable storage media which, when executed by the one or more processors, perform operations comprising:
receiving one or more queries associated with indexable items, the indexable items not yet associated with indices;
ascertaining at least one priority associated with one or more indexable items associated with the one or more queries;
assigning at least one indexing priority to index operations associated with the one or more queries; and
performing one or more indexing operations based on the one or more queries and assigned indexing priorities, the indexing operations comprising building indices by capturing descriptive properties and token occurrence information for each indexable item, wherein an order of the indexing operations is based on a location in a stack of prioritized queries.

16. The computing device of claim 15, wherein the performing comprises selectively indexing items that satisfy the one or more queries.

17. The computing device of claim 15, wherein indexing priorities can be modified in response to a user action.

18. The computing device of claim 15, wherein the operations further comprise using a stack to manage indexing priorities.

19. The computing device of claim 15, wherein the indexing priorities comprise Foreground, High, Low, and Default priority levels.

20. The computing device of claim 15, wherein assigned priorities are based, at least in part, on query types.

* * * * *